United States Patent [19]

Ikeda et al.

[11] Patent Number: 5,388,204
[45] Date of Patent: Feb. 7, 1995

[54] METHOD OF AND APPARATUS FOR COMBINING LINEWORK DATA

[75] Inventors: Iwata Ikeda; Ikuo Ohsawa, both of Kyoto, Japan

[73] Assignee: Dianippon Screen Mfg. Co. Ltd., Kyoto, Japan

[21] Appl. No.: 19,376

[22] Filed: Feb. 18, 1993

[30] Foreign Application Priority Data

Feb. 26, 1992 [JP]  Japan .................................. 4-075160

[51] Int. Cl.⁶ .............................................. G06F 15/20
[52] U.S. Cl. ..................................... 395/162; 395/164
[58] Field of Search ................... 382/16, 55, 9, 19, 56, 382/54, 57; 358/515, 80; 395/162, 163, 164

[56] References Cited

U.S. PATENT DOCUMENTS

| | | | |
|---|---|---|---|
| 4,847,689 | 7/1989 | Yamamoto et al. | 358/80 |
| 5,091,974 | 2/1992 | Sasahara et al. | 382/56 |
| 5,146,511 | 9/1992 | Shirasaki | 382/19 |
| 5,263,095 | 11/1993 | Kitamura | 382/9 |
| 5,283,840 | 2/1994 | Kitamura et al. | 382/16 |

Primary Examiner—Mark R. Powell
Assistant Examiner—U. Chauhan
Attorney, Agent, or Firm—Lowe, Price, LeBlanc & Becker

[57] ABSTRACT

A plurality of linework data including run length data are combined at a high speed and without reconverting run-length data to pixel image data. During the combining operation based on linework data stored in a linework operation memory 50, subsequent linework data is supplemented from an external storage unit 64 to an input linework memory 48. When one of the plurality of linework data in the linework operation memory is used up, the supplement of linework data is transferred from the input linework memory to the linework operation memory, both of which are random access memories. In the combining process of run-length data, unit-run data are respectively extracted from each linework data according to the value of a current position pointer representing an end point of the run which has already been combined. Combined unit-run data is produced by comparing the working data for the plurality of linework data.

14 Claims, 17 Drawing Sheets

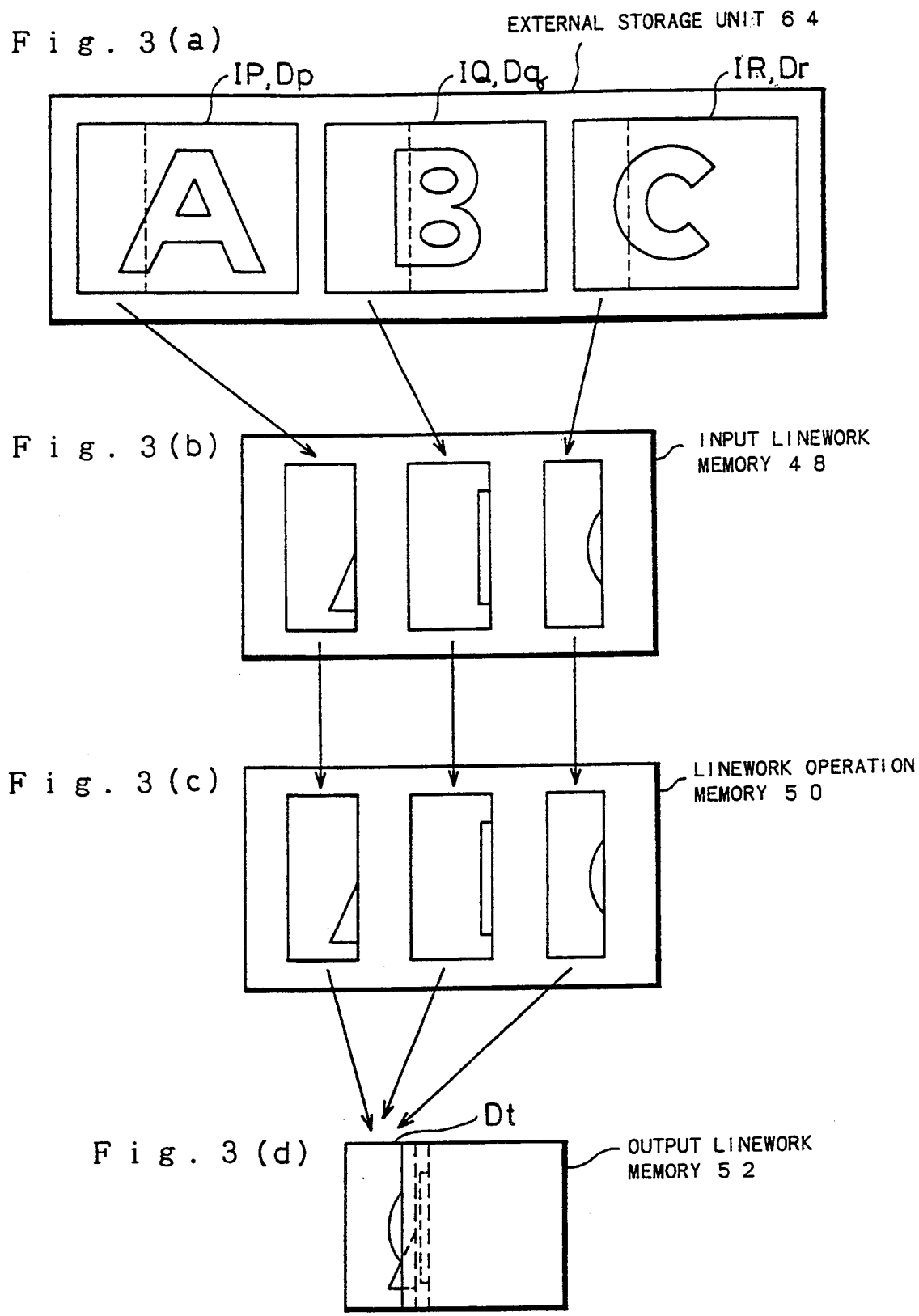

INPUT LINEWORK MEMORY 48

LINEWORK OPERATION MEMORY 50

OUTPUT LINEWORK MEMORY 52

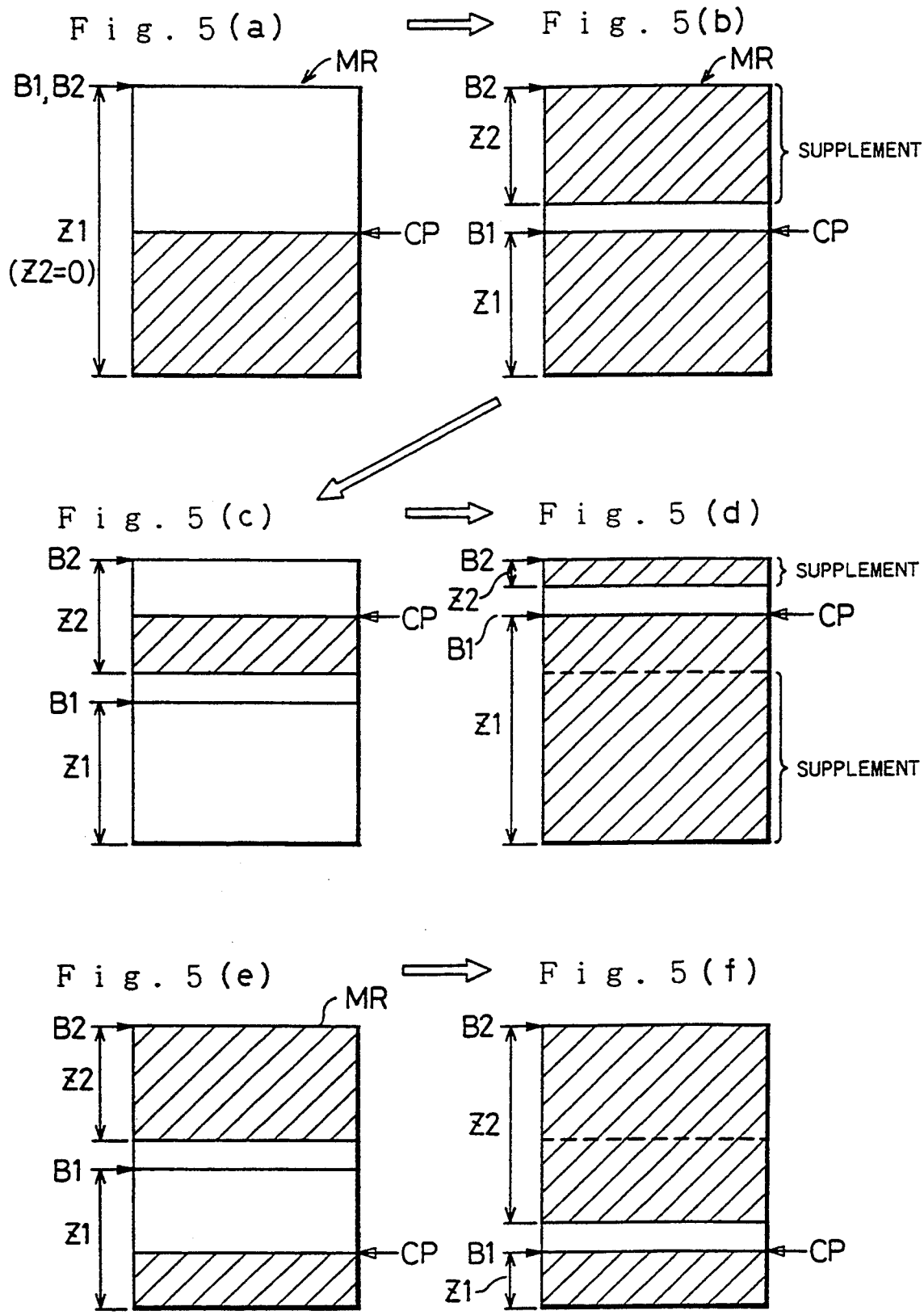

Fig. 8

| | COLOR CODE | PASTING PRIORITY | COLOR DATA (DOT %) | | | | TRANSPARENCY DATA | | | | RUN LENGTH | COORDINATE Xw |
|---|---|---|---|---|---|---|---|---|---|---|---|---|
| | | | Y | M | C | K | Y | M | C | K | | |
| Dp(1) | #0 | 1 | 0 | 0 | 0 | 0 | 1 | 1 | 1 | 1 | 30 | 1 |
| Dp(2) | #1 | 1 | 100 | 0 | 0 | 0 | 0 | 0 | 0 | 0 | 30 | |
| Dp(3) | #0 | 1 | 0 | 0 | 0 | 0 | 1 | 1 | 1 | 1 | 20 | |
| Dp(4) | #2 | 3 | 0 | 0 | 0 | 0 | 1 | 1 | 1 | 1 | 10 | 2 |
| Dp(5) | #3 | 3 | 100 | 0 | 0 | 0 | 0 | 0 | 0 | 0 | 70 | |
| Dq(1) | #0 | 2 | 0 | 0 | 0 | 0 | 1 | 1 | 1 | 1 | 40 | 1 |
| Dq(2) | #1 | 2 | 0 | 0 | 0 | 100 | 1 | 1 | 1 | 0 | 30 | |
| Dq(3) | #0 | 2 | 0 | 0 | 0 | 0 | 1 | 1 | 1 | 1 | 10 | |
| Dq(4) | #0 | 2 | 0 | 0 | 0 | 0 | 1 | 1 | 1 | 1 | 20 | 2 |
| Dq(5) | #1 | 2 | 0 | 0 | 0 | 100 | 1 | 1 | 1 | 0 | 60 | |
| Ds(1) | #0 | 1 | 0 | 0 | 0 | 0 | 1 | 1 | 1 | 1 | 30 | 1 |
| Ds(2) | #1 | 1 | 100 | 0 | 0 | 0 | 0 | 0 | 0 | 0 | 10 | |
| Ds(3) | #2 | 2 | 100 | 0 | 0 | 100 | 0 | 0 | 0 | 0 | 20 | |
| Ds(4) | #3 | 2 | 0 | 0 | 0 | 100 | 1 | 1 | 1 | 0 | 10 | |
| Ds(5) | #0 | 1 | 0 | 0 | 0 | 0 | 1 | 1 | 1 | 1 | 10 | |
| Ds(6) | #4 | 2 | 0 | 0 | 0 | 0 | 1 | 1 | 1 | 1 | 10 | 2 |
| Ds(7) | #5 | 3 | 100 | 0 | 0 | 0 | 0 | 0 | 0 | 0 | 70 | |

Fig. 16
Fig. 16(a)  Fig. 16(b)
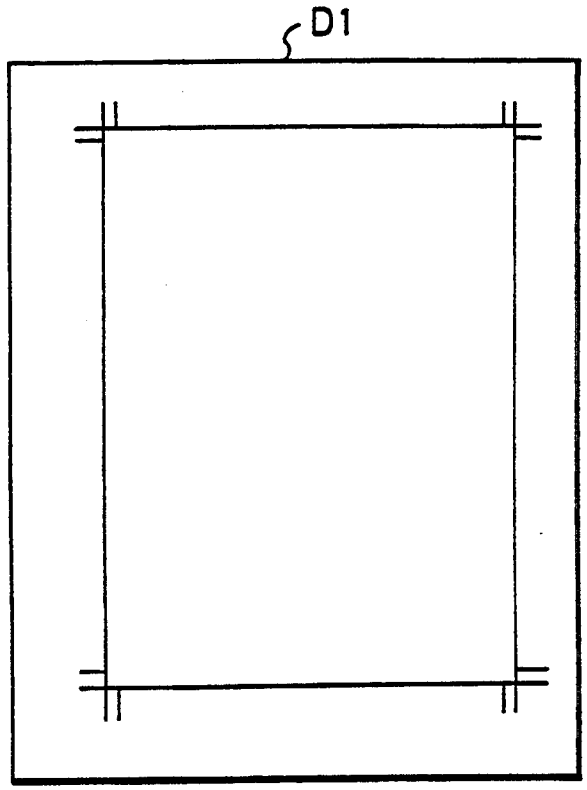
Base page & Register mark
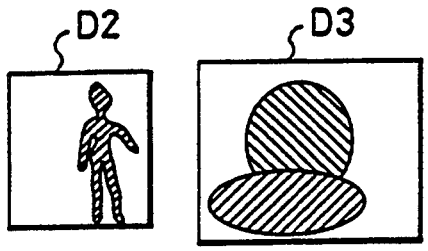
Cut out Mask  Illustration
This is a map. This is United States of America.
Omega-pg is a revolutionary, device-independent page description language.
Text
Fig. 16(c)
 
Bar code  Logo
Fig. 16(d)  Fig. 16(e)
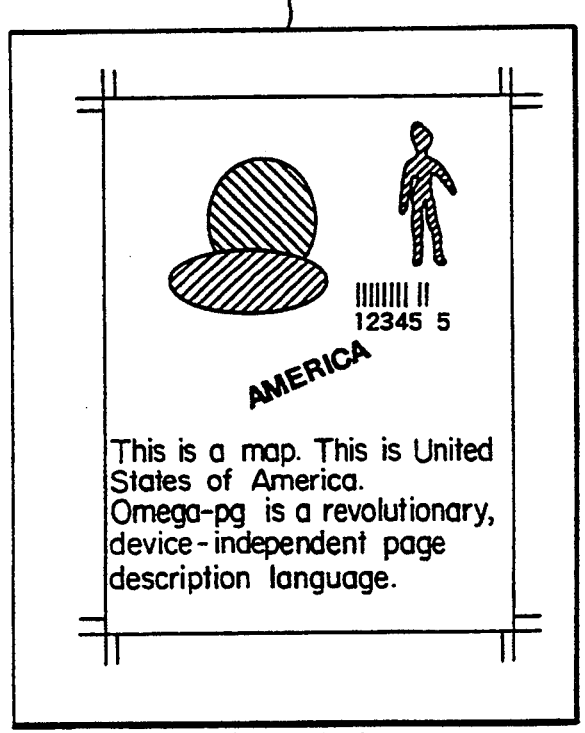
Output Linework data
Fig. 16(f)

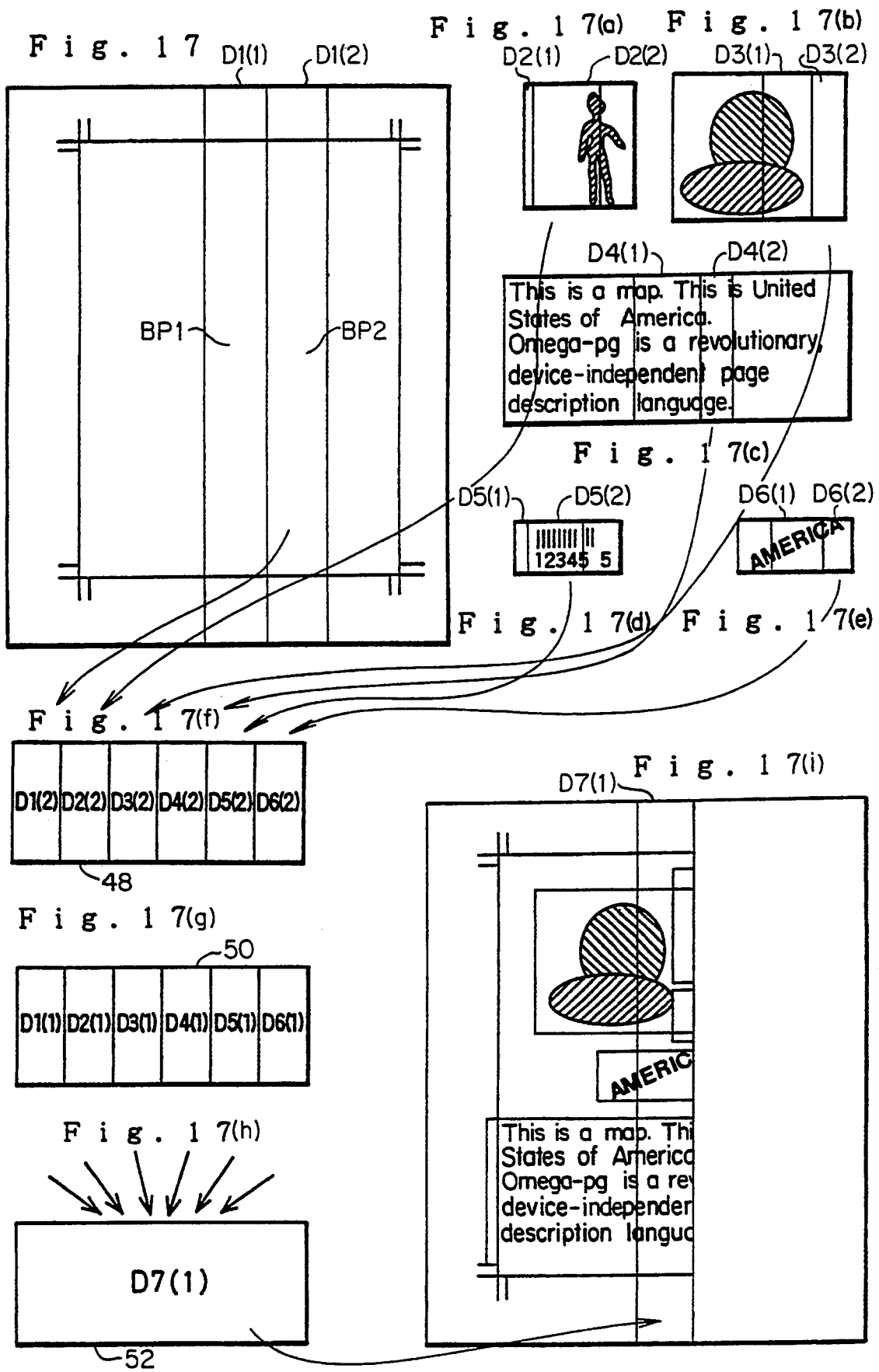

5,388,204

METHOD OF AND APPARATUS FOR COMBINING LINEWORK DATA

BACKGROUND OF THE INVENTION

1. Field of the Invention

The present invention relates to a method of and an apparatus for combining linework data including run-length data, and more particularly to overlay plural linework images one upon another to produced a combined image.

2. Description of the Related Art

Run-length data is a common type of image data to represent a binary image or linework image. Run-length data is used in transferring a linework image through facsimile or storing a linework image in a magnetic disk. Run-length data indicates lengths of "runs" in a linework image for each scanning line. In a black and white image, one "run" means a series of consecutive white pixels or consecutive black pixels on a scanning line, and run-length data indicates the length of each run of the consecutive white pixels or black pixels.

Run-length data is used to represent a colored linework image in commercial printing as well as to represent a black and white image. Each linework is usually colored with the inks of the four primary colors: yellow (Y), magenta (M), cyan (C), and black (K). In order to reproduce a colored linework image, run-length data is prepared for each color of Y, M, C, and K.

In commercial printing, some linework images are combined to form a new linework image. Since the volume of run-length data depends on the number of runs but not directly on the area of the image, the volume of the combined run-length data sometimes increases considerably by the combination. When the capacity of a memory for storing the combined run-length data is not sufficiently large, each linework image before combination is required to be divided into several image areas, and the combination is executed for every divided image area.

Linework data before combination is generally stored in an external storage unit such as a magnetic disk. When combining operation is completed for one of the divided image areas by a combining unit, next linework data is to be supplied from the external storage unit to a memory in the combining unit. Each supply of linework data to the memory in the combining unit stops the combining operation and thereby undesirably extends the executing time of the combining operation.

Incidentally, conventional linework combining process is executed in the order of re-conversion of run-length data to pixel image data; combination of converted pixel image data; and conversion of combined image data into run-length data. The conventional combining process consumes relatively a long time accordingly.

SUMMARY OF THE INVENTION

An object of the present invention is to reduce the time loss due to the supply of linework data to a combining unit while combining linework data.

According to the present invention, the foregoing and other objects are attained by an apparatus for combining a plurality of linework data including run-length data to produce combined linework data representing a combined linework image, comprising; a first processor; a first bus; an auxiliary memory, connected to the first bus, for memorizing the plurality of linework data; a second processor; a second bus connected to the second processor; and first, second, and third main memories of the second processor for memorizing linework data. The first and third main memories are connected to both of the first and second buses, and the second main memory is connected to the second bus. The first processor includes: first data-transfer means for transferring at least a part of each of the plurality of linework data from the auxiliary memory to the first main memory through the first bus. The second processor includes: second data-transfer means for detecting a necessity of data supplementing to the second main memory, and supplementing at least a part of the plurality of linework data from the first main memory to the second main memory through the second bus; and combining means for combining the respective parts of the plurality of linework data stored in the second main memory to produce the combined linework data, and storing the combined linework data in the third main memory.

In the preferred embodiment of the present invention, the second data-transfer means includes means for detecting the necessity of data supplementing when one of the plurality of linework data stored in the second memory has been used up in producing the combined linework data.

The apparatus further comprises a dual port RAM, connected to the first and second buses, for memorizing information to be exchanged between the first and second processors, whereby the first and second processors cooperate according to the information.

Preferably, the first and third main memories are complementarily connected to the first and second buses, and are switched alternately on demand.

According to another aspect of the present invention, the linework data comprises run-length data constituted of unit-run data, the unit-run data including a run-length of each run of a linework image in a predetermined scanning direction, color data representing color of the each run, transparency data indicating whether another linework image laid under the linework image can be seen through the linework data, and a pasting priority indicating an order of overlaying a plurality of linework images. The combining means further comprises: means for computing a last coordinate in a combined linework image which has already been combined, and memorizing the last coordinate as a current coordinate; means for computing a run-end coordinate of each run for each unit-run data of the plurality of linework data stored in the second main memory, the run-end coordinate indicating a coordinate of an end of the each run, and selecting unit-run data as working data with respect to each of the plurality of linework data stored in the second main memory, the working data having the smallest run-end coordinate among unit-run data which have run-end coordinates larger than the current coordinate, and memorizing the working data for the each of the plurality of linework data; and means for producing combined unit-run data representing a run of the combined linework image according to the transparency data and the pasting priority of the working data for the each of the plurality of linework data, the combined linework image being an image which is observed when a plurality of linework images represented by the plurality of linework data are overlaid.

The present invention is also directed to an apparatus for combining a plurality of linework data including run-length data to produce combined linework data representing a combined linework image, comprising: an auxiliary memory for storing the plurality of linework data; first and second main memories for storing at least respective parts of the plurality of linework data; first data-transfer means for transferring at least a part of each of the the plurality of linework data from the auxiliary memory to the first main memory through a first bus; second data-transfer means for detecting a necessity of data supplementing to the second main memory, and supplementing at least a part of the plurality of linework data from the first main memory to the second main memory through a second bus; and combining means for reading the plurality of linework data stored in the second main memory through the second bus, and producing the combined linework data.

The present invention is further directed to a method of combining a plurality of linework data including run-length data with the aid of a computer including an auxiliary memory, and first and second main memories, to produce combined linework data representing a combined linework image, the method comprising the steps of: (a) storing the plurality of linework data in the auxiliary memory; (b) transferring at least a part of each of the the plurality of linework data from the auxiliary memory to the first main memory through a first bus; (c) detecting a necessity of data supplementing to the second main memory, and supplementing at least a part of the plurality of linework data from the first main memory to the second main memory through a second bus; and (d) reading the plurality of linework data from the second main memory through the second bus, and producing the combined linework data.

These and other objects, features, aspects and advantages of the present invention will become more apparent from the following detailed description of the present invention when taken in conjunction with the accompanying drawings.

BRIEF DESCRIPTION OF THE DRAWINGS

FIGS. 3(a) through 3(d) show transfer of linework data during the combining process;

FIGS. 5(a) through 5(f) illustrate data transfer by an interrupt/routine during the combining process;

FIG. 8 shows part of two input linework data and combined linework data obtained;

FIG. 16 schematically illustrates another set of input linework data and output linework data; and FIG. 17 schematically illustrates the method of combining the input linework data shown in FIG. 16.

DETAILED DESCRIPTION OF THE PREFERRED EMBODIMENT

A. Structure of Apparatus

Figure 1:
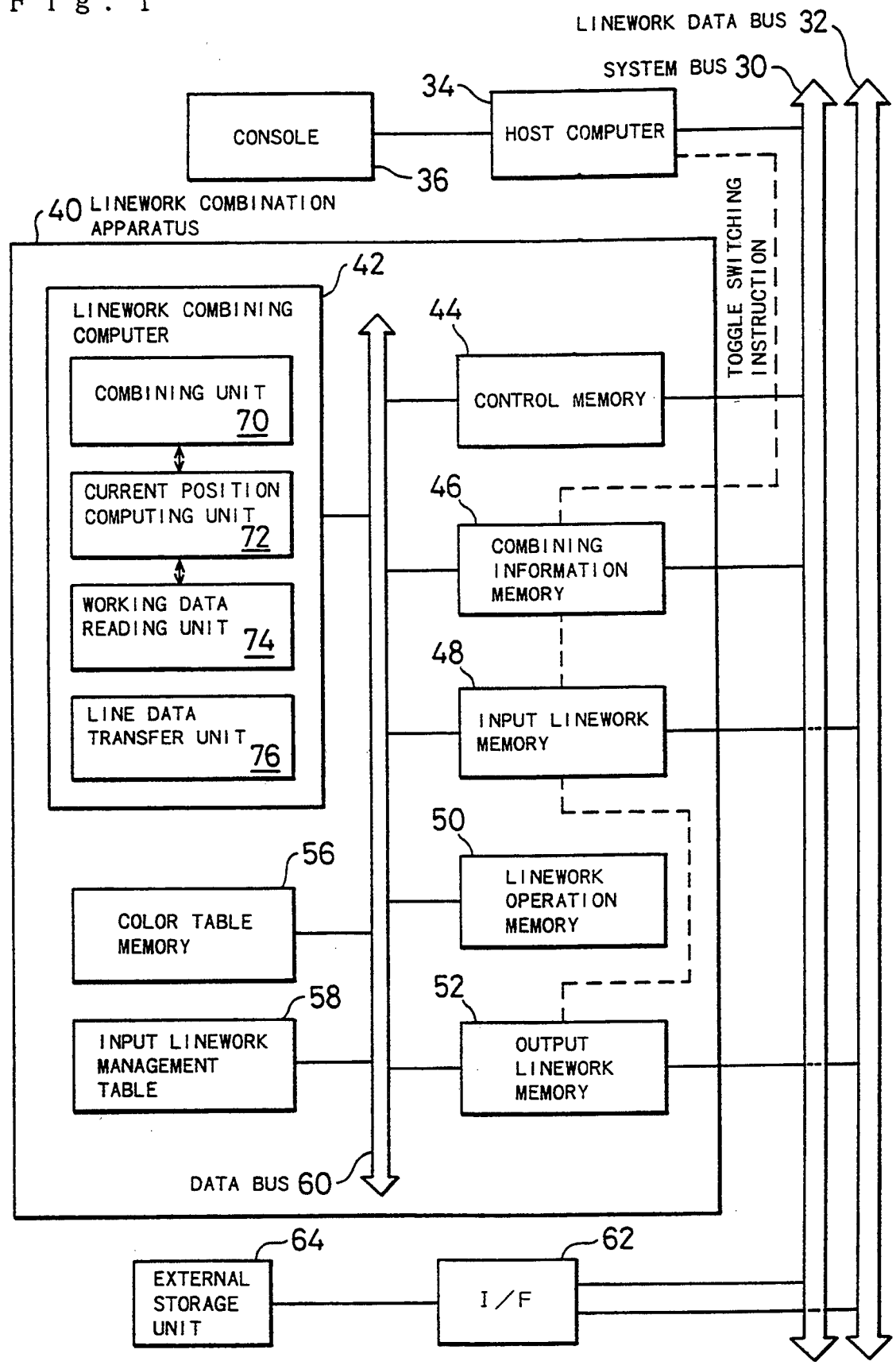
FIG. 1 is a block diagram showing structure of an image processing apparatus embodying the invention.

FIG. 1 is a block diagram showing the structure of an image processing apparatus embodying the present invention. The image processing apparatus includes a linework data bus 32 and a system bus 30 connected to a host computer 34, which is further linked with a console 36.

The image processing apparatus has a linework combination apparatus 40, which further includes a linework combining computer 42, a control memory 44, a combining information memory 46, an input linework memory 48, a linework operation memory 50, an output linework memory 52, a color table memory 56, and an input linework management table 58. These elements of the linework combination apparatus 40 are connected to one another by a data bus 60 in the linework combination apparatus 40. The control memory 44 and the combining information memory 46 are also connected to the system bus 30, and the two linework memories 48 and 52 are connected to the linework data bus 32.

The system bus 30 and the linework data bus 32 are further connected to an external storage unit 64 such as a magnetic disk or an magneto-optical disk through an interface 62.

Functions of the primary elements shown in FIG. 1 are as follows:

(a) Host computer 34 transmits data from the external storage unit 64 to the respective memory elements of the linework combination apparatus 40 or vice versa, and analyzes linework combining information based on operator's instructions. The linework combining information, which is previously stored in the external storage unit 64, includes file names of linework data representing plural linework images to be combined, and combining sequence data indicating an overlay arrangement of the plural linework images. The host computer 34 corresponds to the first processor of the claimed invention.

(b) Console 36 includes a keyboard, a CRT, and a mouse. The console 36 informs the operator of the current status of the image processing apparatus. The operator inputs various instructions with the console 36.

(c) Linework combining computer 42 executes combination of linework data and has a CPU, a RAM, and a ROM, which are not shown in the drawing. As shown in FIG. 1, the linework combining computer 42 further includes a combining unit 70, a current position computing unit 72, a working data reading unit 74, and a linework data transfer unit 76. Functions of the combining unit 70, the current position computing unit 72, the working data reading unit 74, and the linework data transfer unit 76 are implemented by software programs executed by the computer 42. The functions of these units are described later in detail. The linework combining computer 42 corresponds to the second processor of the claimed invention.

(d) Control memory 44 is a dual port RAM simultaneously accessible from both the host computer 34 and the linework combining computer 42 and mediates various executable instructions between the computers.

(e) Combining information memory 46 temporarily stores the linework combining information analyzed by the host computer 34. The combining information includes dimensions of a combined linework image, that is, the numbers of pixels in both a primary scanning direction and a secondary scanning direction, the number of target linework images to be combined (hereinafter referred to as "input linework images"), and file names, offset positions, and the order of combining plural sets of input linework data representing plural input linework images.

(f) Input linework memory 48 is a RAM for storing linework data representing input linework images read out of the external storage unit 64. When N sets of linework data, where N is an integer, are written in this memory, addresses of the input linework memory 48 are substantially divided into N pieces. In practical process, since the upper bits of each address are used for division, addresses are divided into a smallest integer which is not less than N and integral powers of two. The combining information of each linework data written in the input linework memory 48 is stored in the combining information memory 46. The input linework memory 48 corresponds to the first main memory of the claimed invention.

(g) Linework operation memory 50 is a RAM for temporarily storing linework data transferred from the input linework memory 48. The linework combining computer 42 executes combining operation as a function of the linework data in the linework operation memory 50. The linework operation memory 50 is also divided into the number N of input linework images as in the case of the input linework memory 48. The linework operation memory 50 corresponds to the second main memory of the claimed invention.

(h) Output linework memory 52 stores linework data which is combined by the linework combining computer 42. The addresses of the input linework memory 48 and the output linework memory 52 are mapped to show identical positions and are connected to both buses 30 and 32. The connections of the two memories 48 and 52 are switched in response to a toggle switching instruction sent from the host computer 34. Namely, one of the two linework memories 48 and 52 is connected with the linework data bus 32, and the other with the data bus 60. The output linework memory 52 corresponds to the third main memory of the claimed invention.

(i) Color table memory 56 temporarily stores color codes and following data related to each color code: a priority; color data or halftone dot area rates of respective four primary colors, that is, yellow (Y), magenta (M), cyan (K), and black (K); and transparency. The priority and the transparency will be explained later in detail.

(j) Input linework management table 58 stores working data concerning the linework data stored in the input linework memory 48. Contents of the table 58 will be explained later.

(k) External storage unit 64 stores linework data representing input linework images to be combined, linework combining information, and linework data representing a combined linework image.

B. Processing Procedure

Figure 2:
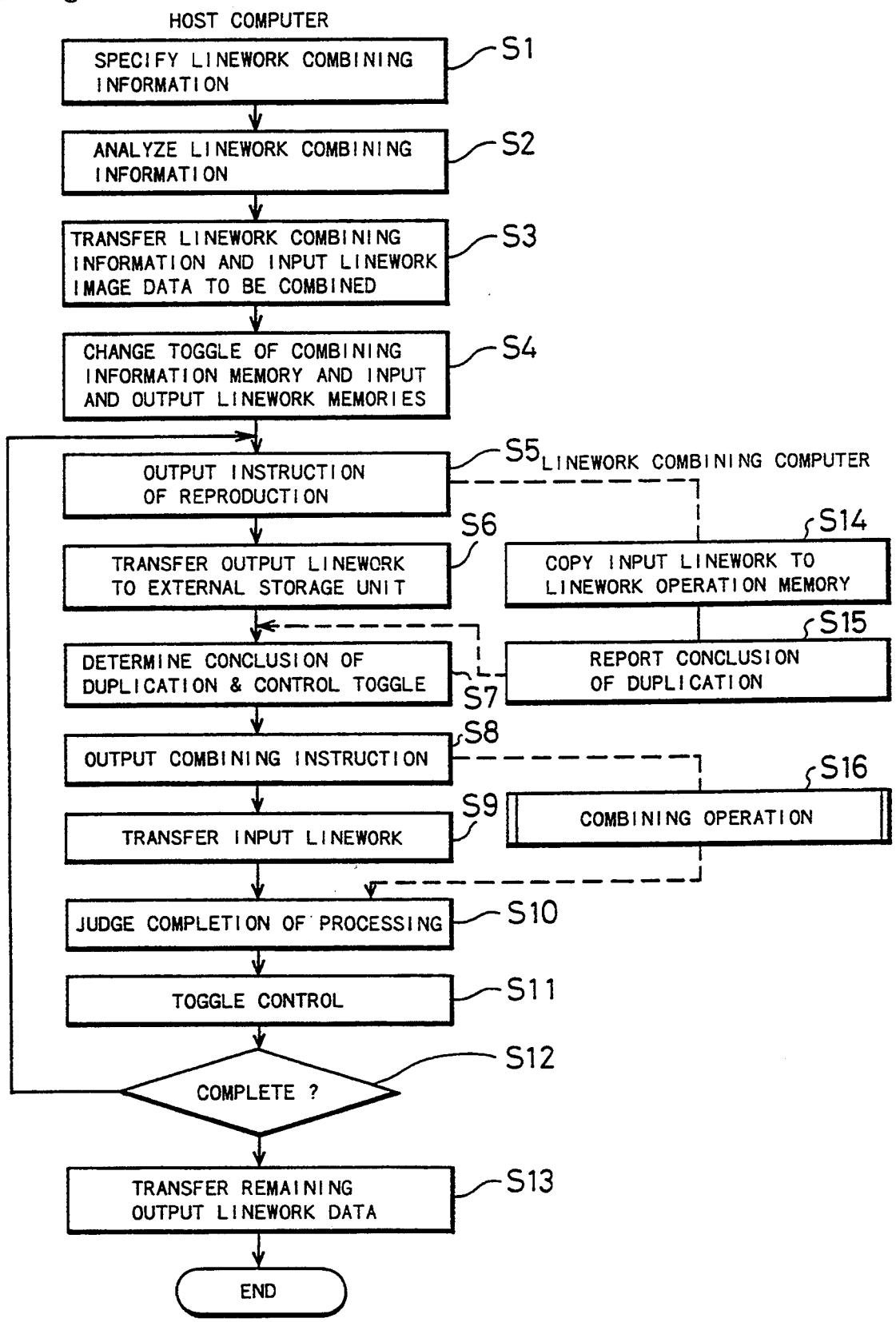
FIG. 2 is a flowchart showing general steps of combining process in the embodiment.

FIG. 2 is a flowchart showing the procedure of the combining process executed in the preferred embodiment.

At step S1, an operator specifies a file name of a linework combining information with the console 36. The linework combining information, which is previously stored in the external storage unit 64, includes names of data files containing linework data representing plural linework images to be combined and combining sequence data indicating the order of overlaying the plural linework images. FIGS. 3(a) through 3(d) illustrate linework data to be processed. FIG. 3(a) shows three linework data Dp, Dq, and Dr stored in the external storage unit 64. In this example, at step S1, the operator inputs a file name of a linework combining information which instructs overlay of linework images IP, IQ, and IR represented by the linework data Dp, Dq, and Dr, respectively, to produce a combined linework image.

At step S2, the host computer 34 reads the linework combining information out of the external storage unit 64 and analyzes the combining information to obtain combining sequence data and file names of linework data which are required for combination of linework images.

At step S3, the host computer 34 stores the combining information into the combining information memory 46, and stores linework data representing the input linework images, which are read out from the external storage unit 64, into the input linework memory 48. FIG. 3(b) shows linework data written in the input linework memory 48 at step S3. In this example, the number of input linework images is equal to three, and the input linework memory 48 is thus divided into four data areas (four is the smallest integer which is not less than three and 2 powers of two). Parts of linework data Dp, Dq, and Dr are respectively stored in three areas out of the four data areas. As shown in FIG. 3(a) and 3(b), the linework data representing the image areas located on the left of broken lines of the respective linework images IP, IQ, and IR are written in the input linework memory 48.

A memory area of an equal capacity is allocated to each of the linework images IP, IQ, and IR both in the input linework memory 48 and in the linework operation memory 50. Since the volume of run-length data depends on the number of runs but not on its image area, the image areas represented by the linework data stored in the memory 48, or in the memory 52, are different from each other.

As the linework data stored in the linework operation memory 50 represent different image areas from each other, even when one of the plural linework data has been used out in the combining operation, parts of the other image data are left in the linework operation memory 50. The linework operation memory 50 is then supplemented with new linework data. In this manner, the combining operation is successively executed to combine all of the linework data in the memory 50 efficiently.

At step S4, the host computer 34 outputs the toggle switching instruction, and the combining information memory 46 and the input linework memory 48 are connected to the data bus 60 in response to the instruction. This switching makes both memories 46 and 48 accessible from the linework combining computer 42.

At step S5, the host computer 34 writes an instruction for duplicating linework data into the control memory 44. The linework combining computer 42 reads the instruction written in the control memory 44 and duplicates input linework data according to the instruction at step S14.

More specifically, at step S14, the linework combining computer 42 duplicates the linework data stored in the input linework memory 48 and sends the duplicate data to the linework operation memory 50. FIG. 3(c) illustrates the linework data stored in the linework operation memory 50. On the completion of the duplication, the program proceeds to step S15 at which the linework combining computer 42 writes specific data indicating the completion of the duplication into the control memory 44.

While the linework combining computer 42 copies linework data from the input linework memory 48 to the linework operation memory 50, the program in the host computer 34 proceeds to step S6 at which it is judged whether the linework data to be externally output (hereinafter referred to as "output linework data") exists in the output linework memory 52 and transfers the existing output linework data to the external storage unit At step S7, the host computer 34 reads the data indicating the completion of the duplication written in the control memory 44 and finds out the completion. The host computer 34 then outputs the toggle switching instruction, thereby switching the input linework memory 48 to connect to the linework data bus 32, and switching the output linework memory 52 to connect to the data bus 60.

At step S8, the host computer 34 writes a combining instruction for combining linework images into the control memory 44. The linework combining computer 42 reads the combining instruction in the control memory 44 and executes the combining operation at step S16. As shown in FIGS. 3(c) and 3(d), the linework combining computer combines the plural linework data stored in the linework operation memory 50 to produce combined linework data, and writes the combined linework data into the output linework memory 52. Details of the combining operation at step S16 will be described later.

Figure 4A:
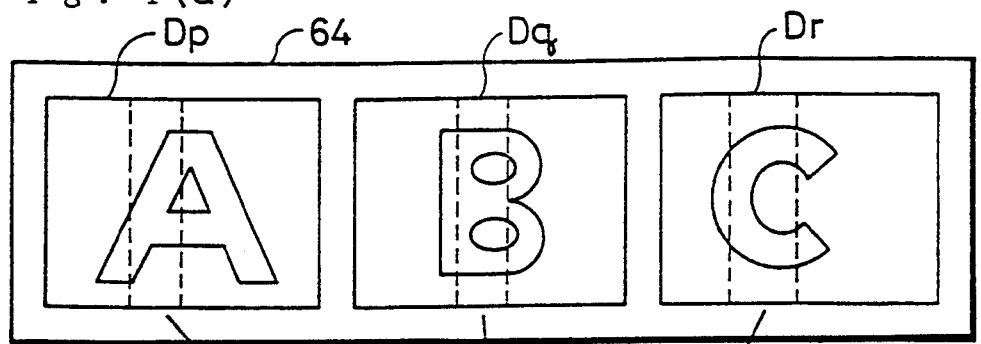
FIGS. 4(a) through 4(d) show transfer of linework data during the combining process.
Figure 4B:
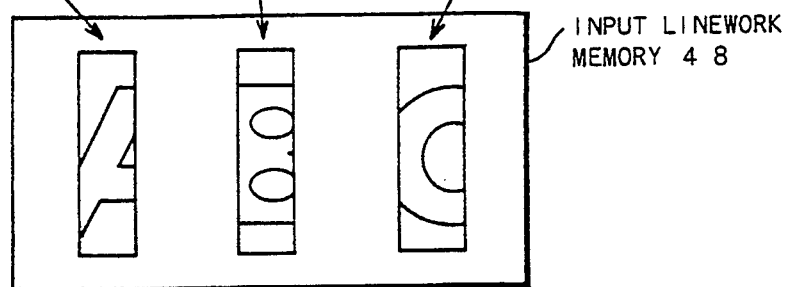
Figure 4C:
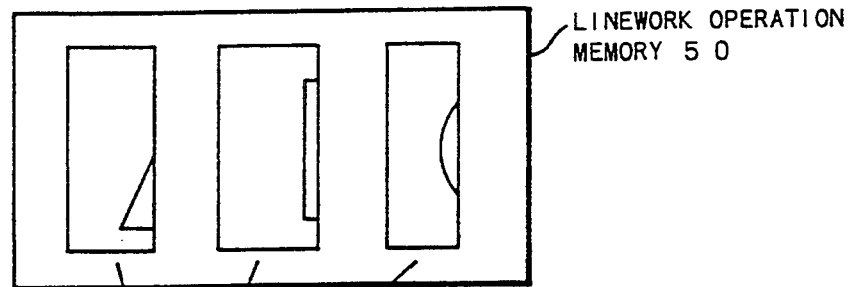
Figure 4D:
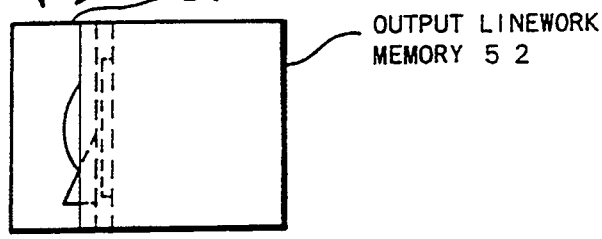

While the linework combining computer 42 executes the combining operation at step S16, the host computer reads next linework data of the respective linework images IP, IQ, and IR out of the external storage unit 64 via the linework data bus 32 and transmits the next linework data to the input linework memory 48 at step S9. FIGS. 4(a) through 4(d) illustrate linework data stored in the respective memories under this processing. FIG. 4(b) shows linework data written in the input linework memory 48 at step S9. The combining process shown in FIGS. 4(c) and 4(d) proceeds simultaneously with the data transfer shown in FIGS. 4(a) and 4(b). As will be explained later, the linework data is transferred from the input linework memory 48 to the linework operation memory 50 every time when the linework operation memory 50 requires a new supply of linework data.

One of the features of the present invention is that the linework operation memory 50 is supplemented with new linework data from the input linework memory 48 every time the memory 50 needs new data while the input linework memory 48 is supplemented with new linework data from the external storage unit 64. The transfer of the linework image data from the input linework memory 48 to the linework operation memory 50 is executed at a high speed because both memories 48 and 50 are random access memories. This data transfer is executed much more quickly than the direct data transfer from the external storage unit 64 to the linework operation memory 50. Further, since the host computer 34 transfers linework data from the external storage unit 64 to the input linework memory 48 via the linework data bus 32, the host computer 34 can supplement linework data to the input linework memory 48 while the linework combining computer 42 are executing the combining operation. This parallel operations efficiently save the processing time for the combining operation. The data transfer during the combining operation will be described later in detail.

The program goes from step S9 to step S10 at which the host computer 34 receives specific data indicating the completion of the combining operation from the linework combining computer 42. The program then proceeds to step S11 at which the host computer 34 outputs the toggle switching instruction to exchange the toggle of the memories 48, 50, and 52 as required. For example, when the output linework memory 52 is currently connected to the data bus 60, the host computer 34 changes the toggle to connect the output linework memory 52 to the linework data bus 32.

At step S12, it is judged whether the combining process is completed for all linework data. When there are some linework data to be processed, the program returns to S5 and repeats the above steps.

When all the combining process is completed, the program proceeds to step S13 at which the combined linework data Dt is transferred from the output linework memory 52 to the external storage unit 64 to be stored therein. However, the combined linework data is transferred from the output linework memory 52 to the external storage unit 64 every time when the output linework memory 52 is filled with the combined linework data in the course of the combining operation executed at step S16.

C. Details of Data Supplementing During Combining Operation

When one of plural linework data stored in the linework operation memory 50 is used up during the combining operation at step S16, the operation of the computer 42 is interrupted, and the linework data is supplemented from the input linework memory 48 to the linework operation memory 50.

FIGS. 5(a) through 5(f) show the procedure of the data supplementing according to the interruption routine. As shown in FIG. 5(a), a memory area MR of each linework in the linework operation memory 50 is provided with first and second starting pointers B1 and B2, first and second size data Z1 and Z2 which are corresponding to the first and second starting pointers B1 and B2, respectively, and a current pointer CP. The starting pointers B1 and B2 indicate the first addresses of two separate parts of the memory area MR in which the linework data is stored. In FIGS. 5(a) through 5(f), the address value increases downward. The first and second size data z1 and z2 indicate the size of the linework data stored after the first and second starting pointers B1 and B2, respectively. The current pointer CP represents an address of the linework data to be read out next. The linework data which is stored in a space between the first starting pointer B1 and the current pointer CP has already been used for the combining operation while the linework data which is stored in a space between the current pointer CP and the end point of the second size data Z2, which is shaded in FIGS. 5(a) through 5(f), has not yet been used.

In FIG. 5(a), both the first and second starting pointers B1 and B2 indicate the head address of the memory area MR, and the second size data z2 is equal to zero.

It is assumed that one of the plural linework data stored in the linework operation memory 50 has been used up while another linework data is in the state of FIG. 5(a). There is vacancy in the space between the first starting pointer B1 and the current pointer CP. The vacant space is then supplemented with next linework data as shown in FIG. 5(b). In the state of FIG. 5(b), the first starting pointer B1 moves to the position of the current pointer CP, and the first size data Z1 is changed to a value corresponding to the size of a space between the first starting pointer B1 and the end address of the memory area MR. The second starting pointer B2 reins at the head address of the memory area MR, and the second size data Z2 is converted to a value showing the size of a space between the head address and the address showing the end of the first part of the effective linework data. The linework operation memory 50 is successively supplemented with linework data in this manner.

Although there is still some vacant space left in the example of FIG. 5(b), all the vacant space down to the position of the current pointer CP in the memory area MR may be filled with the supplemented linework data.

When the combining operation is re-started after the data supplementing of FIG. 5(b), the linework data is successively read out downward from the position of the first starting pointer B1 for the combining process. On reaching the end of the memory area MR, the linework data is then read from the beginning of the memory area MR indicated by the second starting pointer B2. In FIG. 5(c), part of the linework data after the head address has already been read out for the combining process.

When one of the plural linework data has been used up in the linework operation memory 50 while another linework data is in the state of FIG. 5(c), the vacant space is again supplemented with subsequent linework data as shown in FIG. 5(d). In the state of FIG. 5(c), as in the case of FIG. 5(a), the first starting pointer B1 moves to the position of the current pointer CP, and the first size data Z1 is changed to a value corresponding to the size of a space between the first starting pointer B1 and the end address of the memory area MR. The second starting pointer B2 remains at the head address of the memory area MR, and the second size data Z2 is converted to a value showing the size of a space between the head address and the address showing the end of the first part of the effective linework data.

FIG. 5(e) shows the state between FIG. 5(b) and FIG. 5(c). The current pointer CP is moving from the position of the first starting pointer B1 towards the end of the memory area MR. When one of the plural linework data has been used up in the linework operation memory 50 while another linework data is in the state of FIG. 5(e), vacant space is again supplemented with subsequent linework data as shown in FIG. 5(f). In the state of FIG. 5(e), the first and second starting pointers B1 and B2 and the corresponding size data Z1 and Z2 are changed in the same manner as above.

As described above, every time when one of the plural linework data has been used up in the linework operation memory 50, subsequent linework data is supplemented from the input linework memory 48 to the linework operation memory 50. This procedure allows a linework image of a large size to be combined in relatively a short processing time.

Since the combined linework data is output from the output linework memory 52 to the external storage unit 64 every time when the output linework memory 52 is filled with combined linework data, no combined linework data is discarded due to the limitation of the memory size.

D. Details of Combining Operation

The structure of the linework data and an example of a linework image to be processed will be described below prior to the detailed explanation of the combining process at step S16 (FIG. 2).

Figure 6:
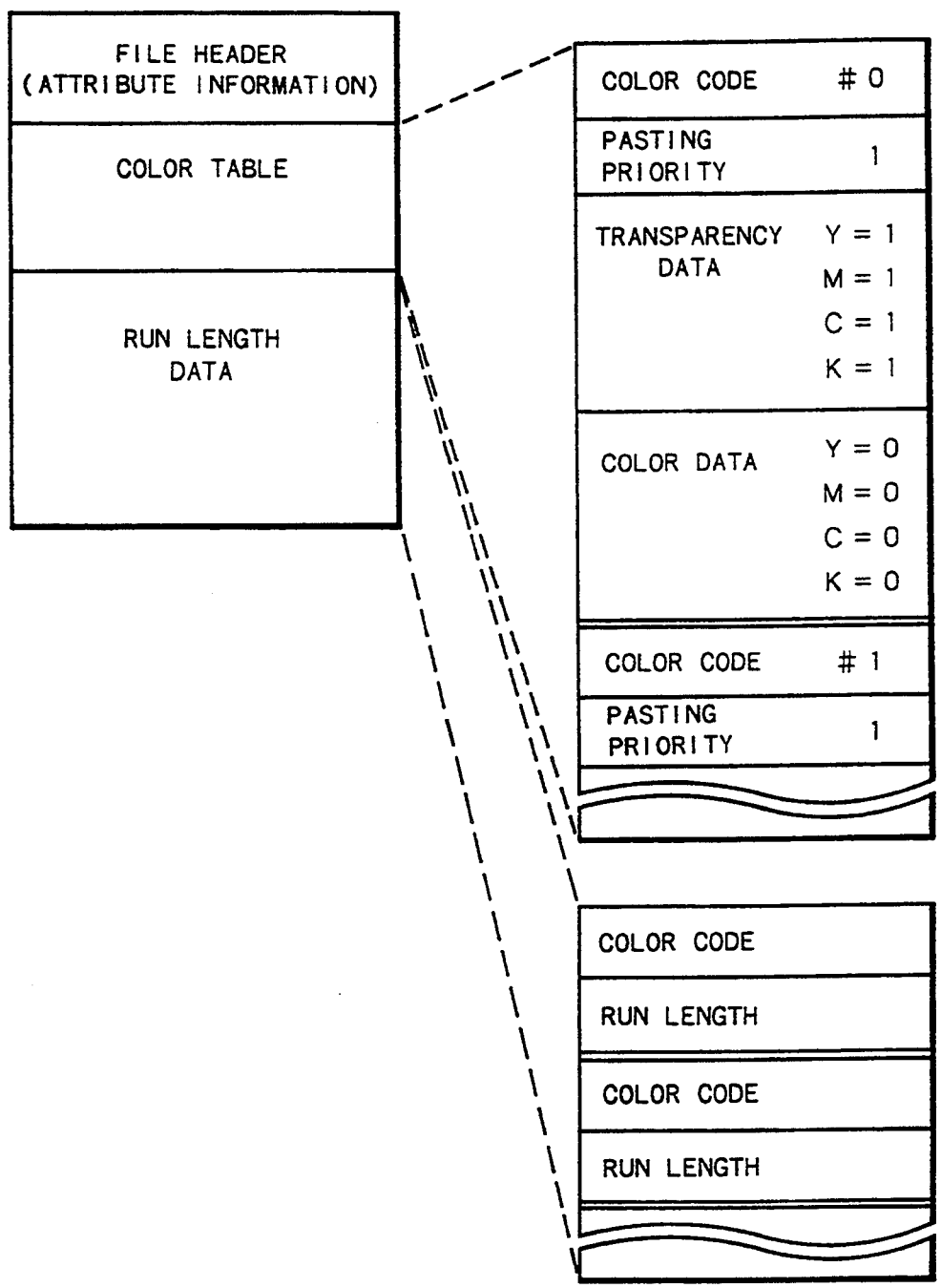
FIG. 6 shows structure of linework data.

FIG. 6 shows the structure of the linework data, which includes a file header, a color table, and run-length data. Each unit of the run-length data has a color code representing the color of each run and the length of the run. The color table includes a pasting priority of each color code, transparency data, and color data. The pasting priority is a priority of each color code in overlaying linework images. The greater the pasting priority is, the more upper the run of the color code is positioned. The color data indicates a halftone-dot area rate, or a dot percent, of each color component, that is, each of Y, M, C, and K. The transparency data is assigned separately to each color component.

Figure 7:
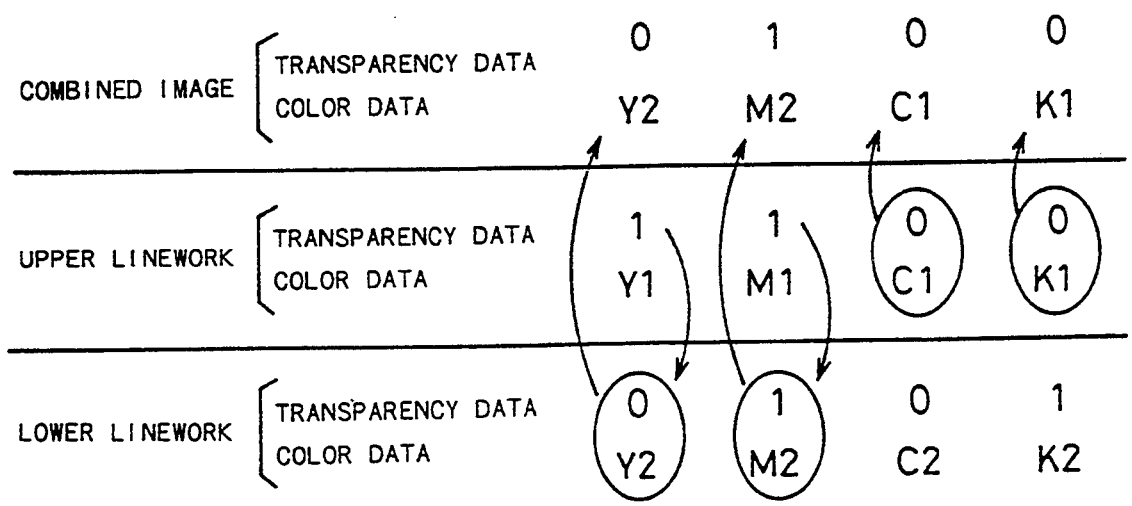
FIG. 7 is an explanatory view showing examples of transparency data.

The part of a linework image whose transparency data is one is treated to be transparent if some other image is under the linework image; that is, the part of the lower image is seen through the upper linework image to become the corresponding part of a resultant combined image. On the contrary, if the part of the upper linework image has the transparency data of zero, the part of the upper linework image is used as the corresponding part of a resultant combined image. FIG. 7 is an explanatory view showing an example of transparency data. When the transparency data of the upper linework image is one for certain color components, the transparency data and color data of the lower linework image for the color components are used to form a combined image. On the other hand, when the transparency data of the upper linework image is zero, the transparency data and color data of the upper linework image are used to form the combined image.

FIG. 8 shows part of two target linework data Dp and Dq and combined linework data Ds, which is obtained by combining the two linework data Dp and Dq. The table shown in FIG. 8 includes the color code, the pasting priority for the color code, the color data or dot percent of each color component, the transparency data of each color component, and the run length of each run. A separate color table is applied to each linework data Dp, Dq, and Ds in FIG. 8. In the explanation below, "unit-run data" denotes a set of run-length data representing a single run (for example, Dp(1), Dp(2)).

Although three or more linework data can simultaneously be combined with one another as shown in FIGS. 3 and 4, the following explanation is based on an example of combining two linework data for clarity of explanation.

Figure 9:
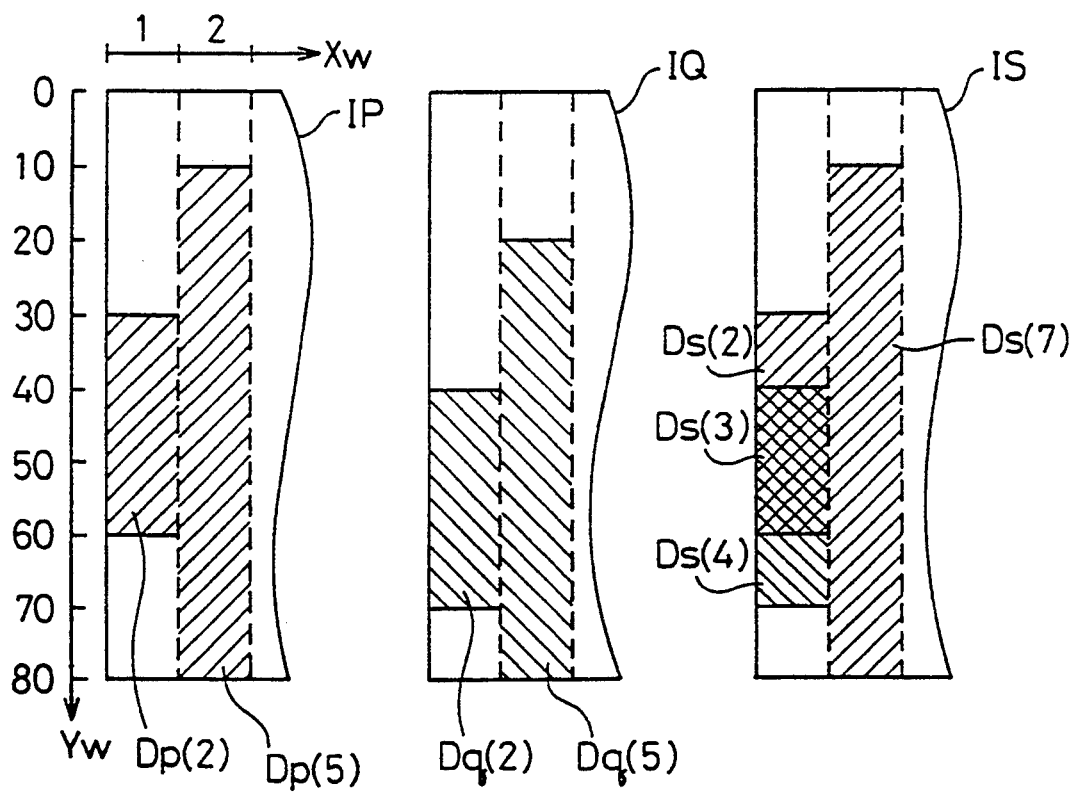
FIGS. 9(a) through 9(c) are conceptive views showing linework images corresponding to the respective linework data of FIG. 8.

FIGS. 9(a) through (c) schematically illustrate linework images IP, IQ, and IS represented by the respective linework data Dp, Dq, and Ds shown in FIG. 8. The shaded parts in FIGS. 9(a) through 9(c) are image parts which are not background part. The same shading does not necessarily show an identical image part. A primary-scanning coordinate Yw is assumed to have the maximum value of 80. When the cumulative run-length of unit-run data in each linework data (FIG. 8) is greater than 80, the unit-run data represents a run on the subsequent scanning lines. For example, the unit-run data Dp(4) and Dp(5), Dq(4) and Dq(5), and Ds(6) and Ds(7) represent the image on the second scanning line. The value of the secondary-scanning coordinate Xw is shown for each unit-run data at the right end side of FIG. 8. The secondary-scanning coordinate Xw indicates the position of a scanning line running in the primary scanning direction.

On the first scanning line, the first linework data Dp has the lower pasting priority of one while the second linework data Dq has the higher priority of two. The second linework image IQ is pasted over the first linework IP accordingly. On the second scanning line, on the contrary, the first linework data Dp has a higher priority than the second linework data Dq. The first linework image IP is thus pasted over the second linework image IQ.

Figure 10:
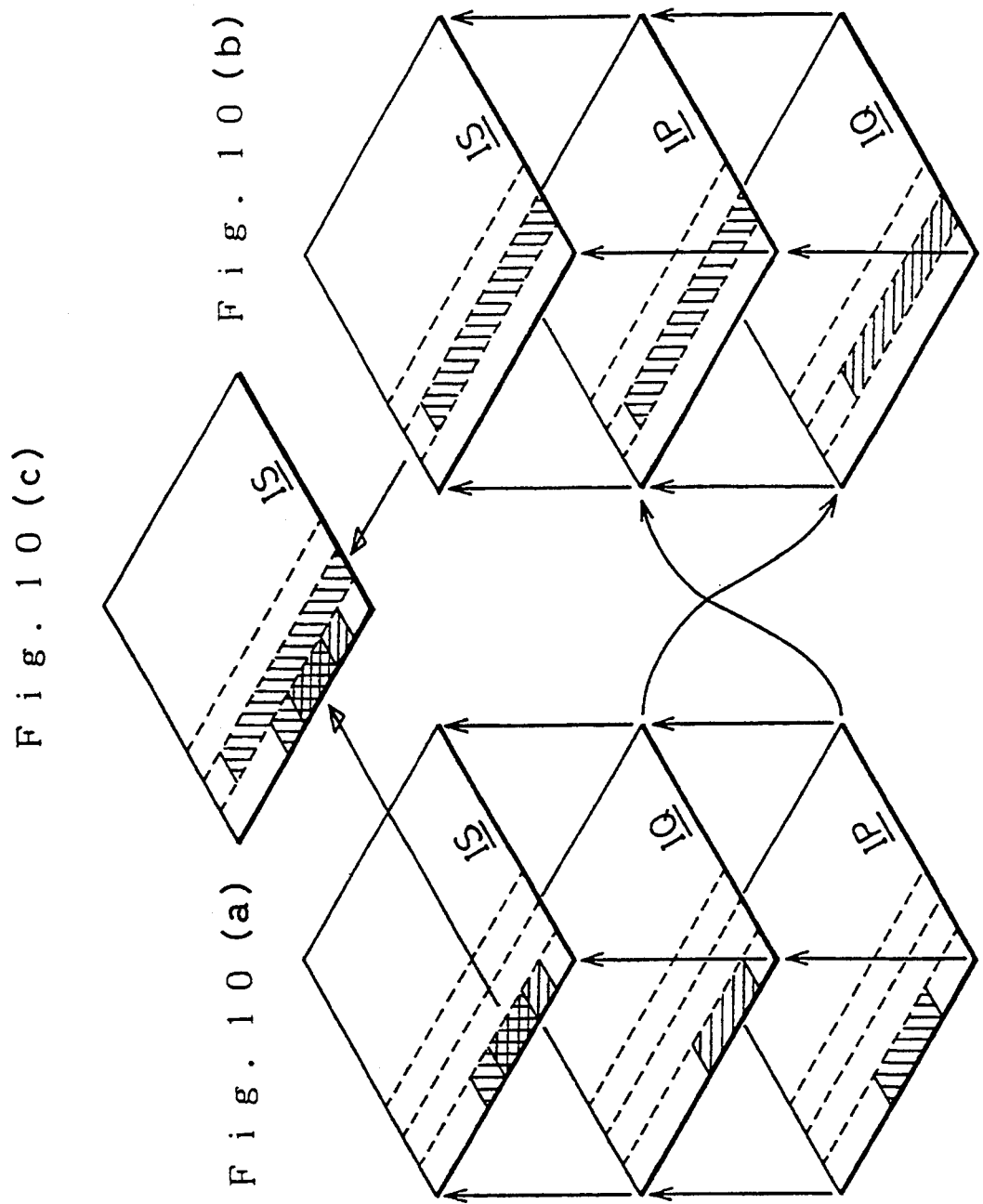
FIGS. 10(a) through 10(c) are conceptive views showing the combining process of the linework images of FIGS. 9(a) through 9(c) in three dimensions.

FIGS. 10(a) through 10(c) schematically illustrate the combining process of the linework images IP and IQ to form a combined linework image IS three-dimensionally. On the first scanning line, the second linework image IQ is pasted over the first linework image IP as shown in FIG. 10(a), whereas on the second scanning line, the first linework image IP is pasted over the second linework image IQ as shown in FIG. 10(b), thereby forming the combined linework image IS shown in FIG. 10(c).

Although all the runs on each scanning line have the same pasting priority in the above example, each run may have a different priority.

Figure 11:
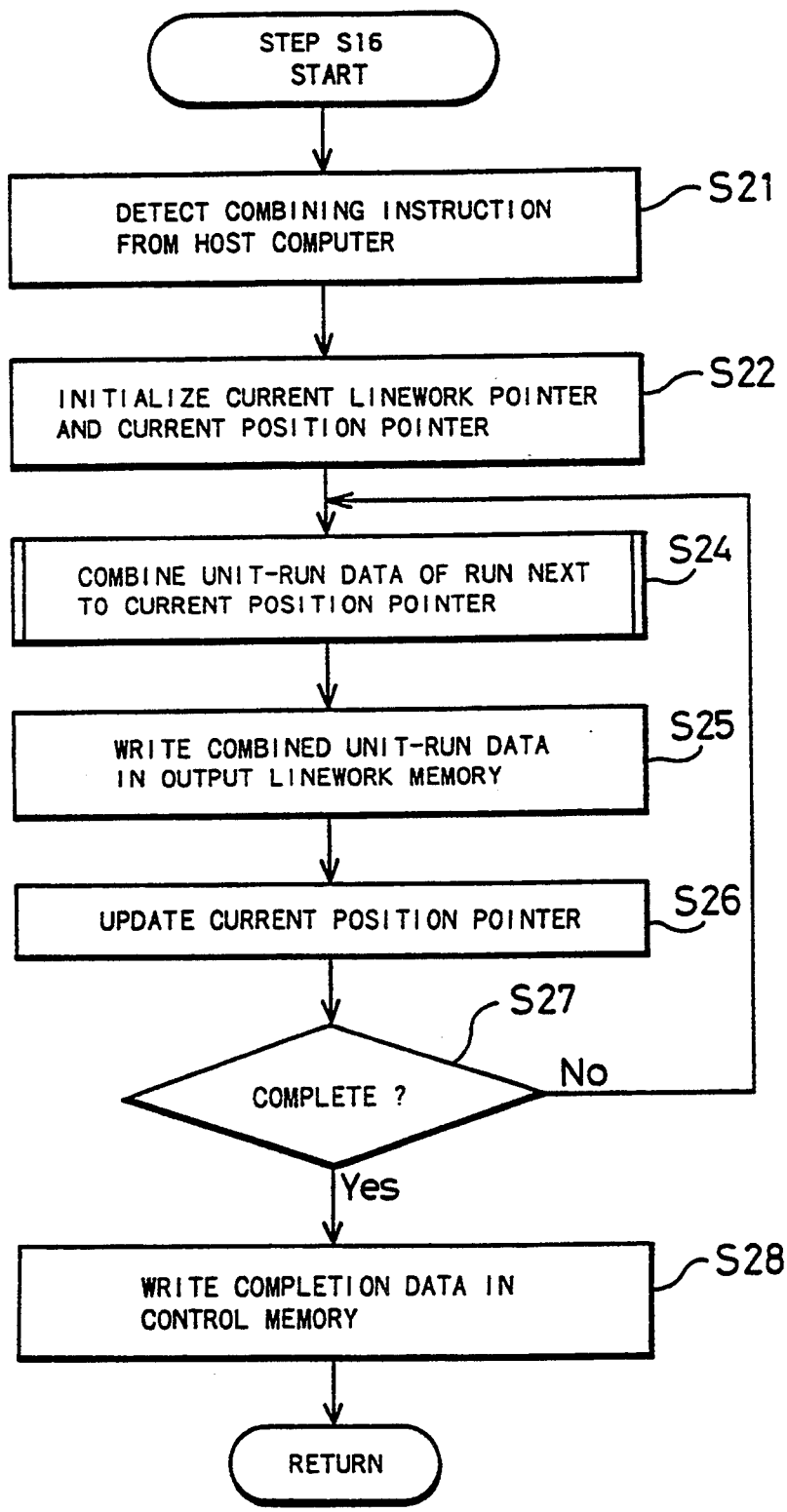
FIG. 11 is a flowchart showing details of the combining operation executed at step S16 of the flowchart of FIG. 2.

FIG. 11 is a flowchart showing details of the combining operation executed at step S16 in the flowchart of FIG. 2.

At step S22, the linework combining computer 42 detects the combining instruction in the control memory written by the host computer At step S22, processing parameters including a current linework pointer and a current position pointer are initialized. The current linework pointer indicates the linework data Dt currently under the combining process. The current position pointer indicates coordinates (Xc, Yc) of the last pixel in a combined linework image which has already been combined, and is initialized to (0, 0). In the following process, the current position computing unit 72 (FIG. 1) determines the value of the current position pointer.

Figure 12:
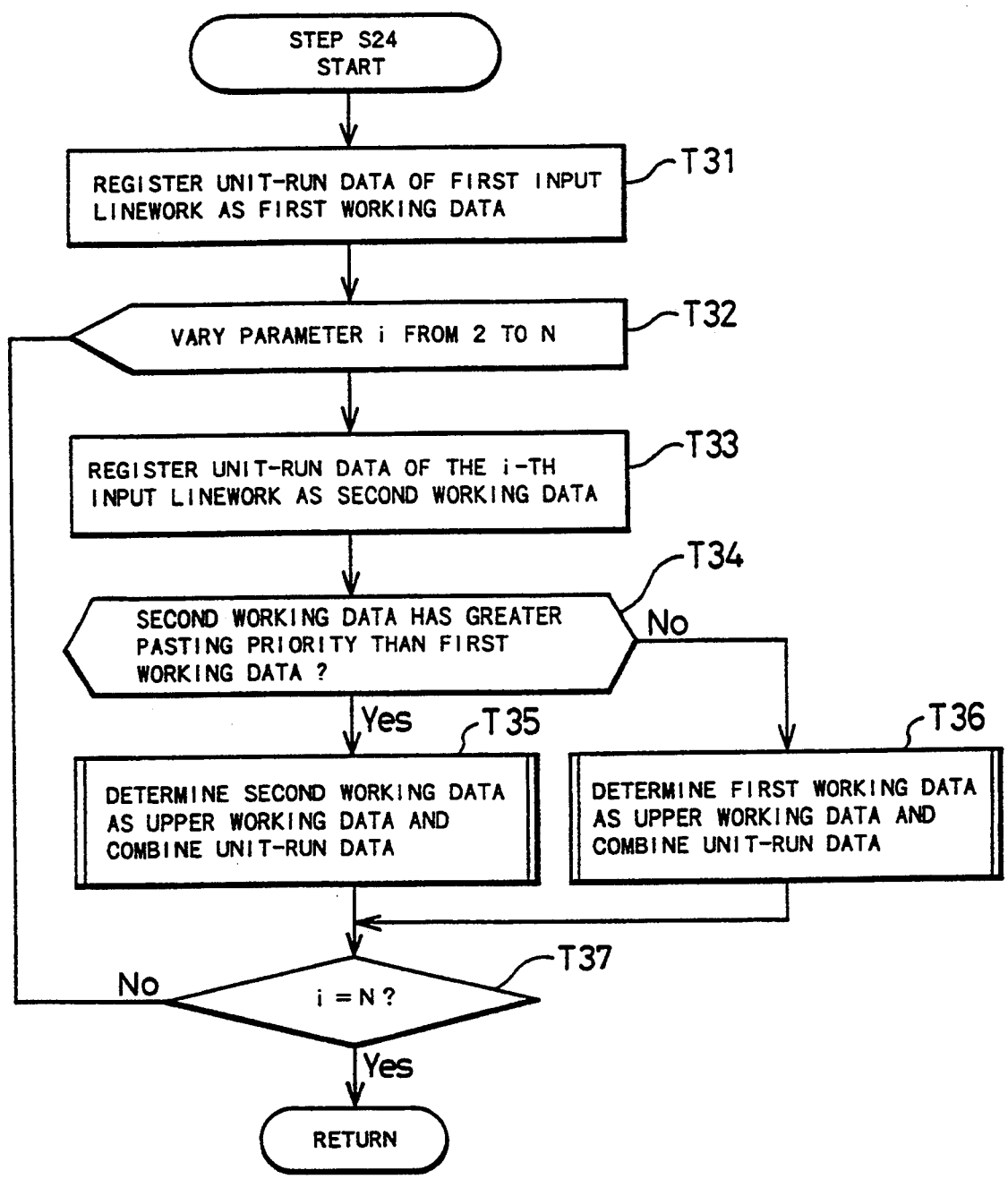
FIG. 12 a flowchart showing steps for extracting unit-run data at step S24 of the flowchart of FIG. 11.
Figure 13:
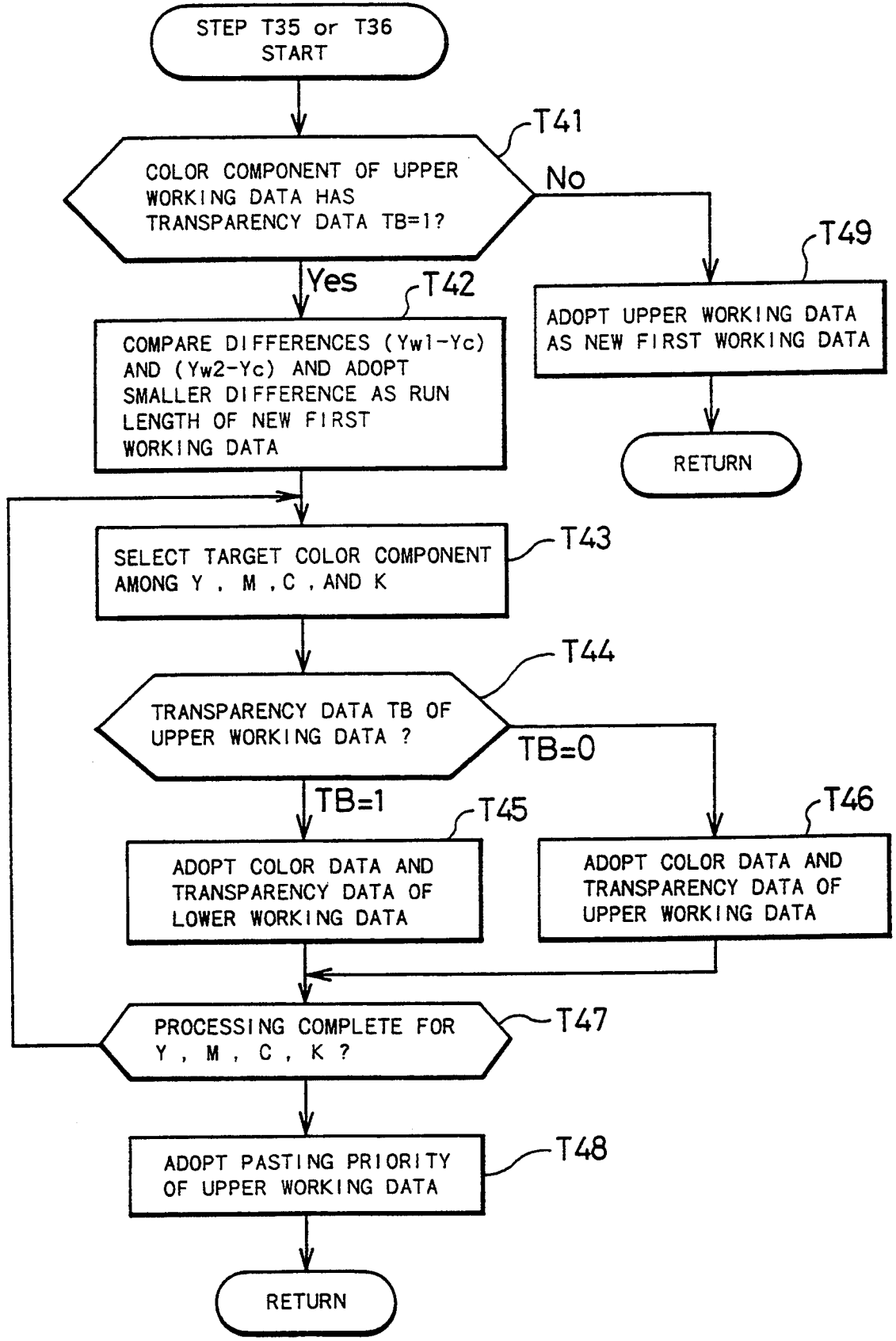
FIG. 13 is a flowchart showing details of steps T35 or T36 of the flowchart of FIG. 12.

The program then proceeds to step S24 at which the combining unit 70 combines unit-run data of a run beginning at the position indicated by the current position pointer. FIGS. 12 and 13 are flowcharts showing details of the processing at step S24.

At step T31, one of unit-run data of the first linework image IP is supplied from the linework operation memory 50 to the input linework management table 58 and registered as a first working data. FIGS. 14(a) and 14(b) schematically illustrate the contents of the current position pointer and the input linework management table 58.

Figure 14:
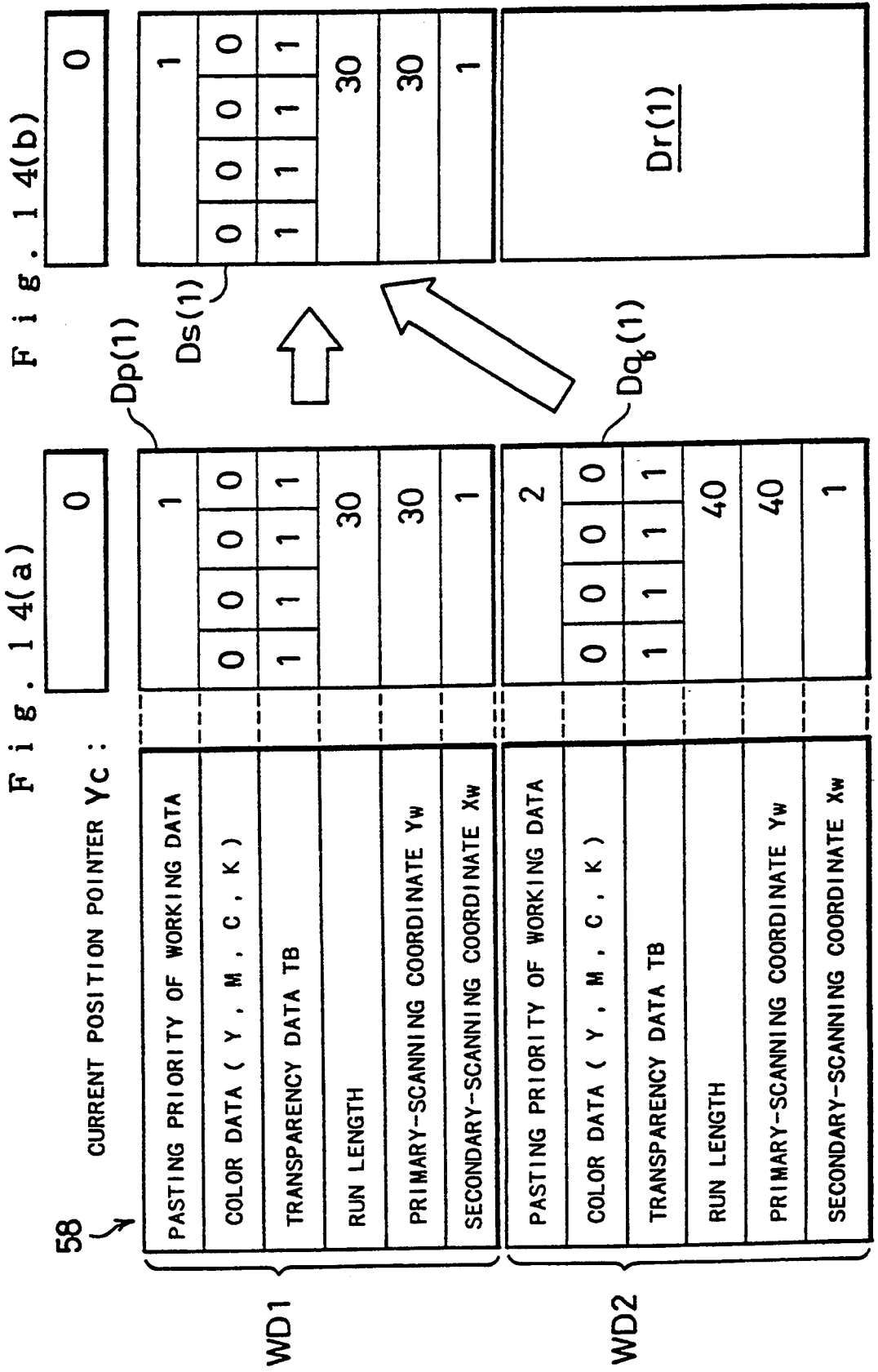
FIGS. 14 (a) and 14(b) show contents of a current position pointer and an input linework management table.

As clearly shown in FIGS. 14(i a) and 14(b), respective ones of unit-run data for two target linework data are registered as working data WD1 and WD2 in the input linework management table 58. At step T31, the first unit-run data of the first linework data Dp is registered as the first working data WD1 while the second working data WD2 has not been registered yet.

The input linework management table 58 includes the pasting priority, the color data, the transparency data TB, the run length of each run, the primary-scanning coordinate Yw and the secondary-scanning coordinate Xw of the end point of each run, with respect to each working data WD1 and WD2. The working data is constituted by the unit-run data whose end point has the primary-scanning coordinate Yw which is the smallest among the values larger than the value of the current position pointer. In the beginning of the combining process, the coordinates (Xc, Yc) of the current position pointer are set equal to (0, 0). The first data of each linework data is thus registered as working data in the input linework management table 58 accordingly. The working data reading unit 74 (FIG. 1) executes the registration of the working data.

At step T32, a parameter "i" for specifying target linework data for the combining process is set in the range from two to N, and the processing of steps T33 through T37 are repeated for each value of the parameter i. Here N denotes the number of input linework images; in the embodiment, N is equal to three. The input linework data Dp, Dq, and Dr shown in FIG. 3 respectively correspond to the values of the parameter i of 1, 2, and 3.

At step T33, one unit-run data of the second linework data Dq, which is designated by the parameter i=2, is registered as the second working data WD2 in the input linework management table 58. FIG. 14(a) shows the contents of the input linework management table 58 at step T33.

The program then goes to step T34 at which the pasting priorities are compared between the first working data WD1 and the second working data WD2. When the second working data WD2 has a greater pasting priority, the program proceeds to step T35. When the first working data WD1 has a greater pasting priority, on the contrary, the program proceeds to step T36. The processing at steps T35 and T36 are identical with each other, and the only difference is the relation between the first working data WD1 and the second working data WD2.

FIG. 13 is a flowchart showing details of steps T35 or T36. At step T41, it is judged whether the transparency data TB is equal to one for at least one of the four color components Y, M, C, and K in the upper working data; the upper working data is the data having the greater pasting priority between the first and second working data WD1 and WD2. When the transparency data TB is zero, which means opaque, for all the four color components, the program proceeds to step T49 at which the upper working data is determined to be new first working data WD1. On the completion of step T49, the program goes to Step T37 in the flowchart of FIG. 12.

When the transparency data TB is equal to one, which means transparent, for at least one color component in the upper working data, the program proceeds to step T42 at which the run-length of the first working data WD1 is updated. In the example of FIG. 14(a), step T42 is executed. In updating of step T42, computed are the difference (Yw1-Yc) between a primary-scanning coordinate Yw1 of the first working data WD1 and the current position pointer Yc, and the difference (Yw2-Yc) between a primary-scanning coordinate Yw2 of the second working data WD2 and the current position pointer Yc. The smaller of the differences (Yw1-Yc) and (Yw2-Yc) is adopted as the run-length of the updated first working data WD1. In the example of FIG.

14(a), the current position pointer Yc is set equal to zero while the differences (Yw1-Yc) and (Yw2-Yc) are respectively equal to 30 and 40. The smaller difference of 30 is then adopted as the run-length of the updated first working data WD1 shown in FIG. 14(b).

At steps T43 through T47, the color data and the transparency data of the first working data WD1 are updated respectively as follows.

At step T43, a target color component, or a color component to be processed, is selected among the four color components Y, M, C, and K.

At step T44, it is judged whether the transparency data TB of the upper working data is equal to one. When the transparency data TB is equal to one, the program proceeds to step T45. When the transparency data TB is equal to zero, on the other hand, the program goes to step T46.

At step T45, the color data and the transparency data of the lower working data are adopted as those of the updated first working data WD1. At step T46, on the contrary, the color data and the transparency data of the upper working data are adopted as those of the updated first working data WD1.

On completion of step T45 or step T46, the program goes to step T47 at which it is judged whether the processings of steps T44 through T46 are completed for all the color components Y, M, C, and K. When the answer is NO at step T47, the program returns to Step T43 to select a next target color component, and steps T44 through T47 are repeated.

When the answer is YES at step T47, the program proceeds to step T48 at which the pasting priority of the upper working data is adopted as that of the updated first working data WD1. FIG. 14(b) shows the contents of the updated first working data WD1.

When either step T35 or step T36 is completed in the flowchart of FIG. 12, the program proceeds to step T37 at which the parameter i is compared with N. When the parameter i is less than N, the program returns to step T32 at which the parameter i is increased by one, and steps T33 through T37 are repeated again. In the example, the unit-run data Dr(1) of the third linework data Dr designated by the parameter i=3 is registered as the second working data WD2 at step T33 (see the lower part of FIG. 14(b)), and the above processing is repeatedly executed.

The first working data WD1 obtained by executing steps T32 through T37 for N pieces of input linework images is the unit-run data Dt representing a combined image which is obtained by combining the N pieces of the input linework images. After the above processing, the program goes to step S25 in FIG. 11, at which the combined unit-run data is written in the output linework memory 52.

At step S26, the coordinates (Xc, Yc) of the current position pointer are updated. More specifically, the primary-scanning coordinate Yw of the end point of the combined unit-run data written in the output linework memory 52 is adopted as the new primary-scanning coordinate Yc of the updated current position pointer. Every time when the combining process is completed for each scanning line, the secondary-scanning coordinate Xc of the current position pointer is also updated.

At step S27, it is judged whether the combining process is completed for all the input linework data. When there is unprocessed unit-run data left in the N pieces of the input linework data, the program returns to step S24, and steps S24 through S27 are repeated again.

When the pasting priority, the color data, the transparency data, and the run-length with respect to each run are determined for the combined linework data Dt, the color table is created for the linework data Dt. The color table indicates the pasting priority, the color data, and the transparency data for each color code, and different combinations of the pasting priority, the color data, and the transparency data are assigned with different color codes. The color table and the run-length data constitute the linework data Dt as shown in FIG. 6.

When the combining process is completed for all the input linework data, the program proceeds to step S28 at which the linework combining computer 42 writes specific completion data indicating the completion of the combining operation in the control memory reads the completion data written in the control memory 44, and executes steps S10 through S13 in the flowchart of FIG. 2 to transfer the combined linework data Dt to the external storage unit E. Modifications The present invention is not limited to the above embodiment, but the following modifications can be applied without departing from the scope of the invention.

Figure 15:
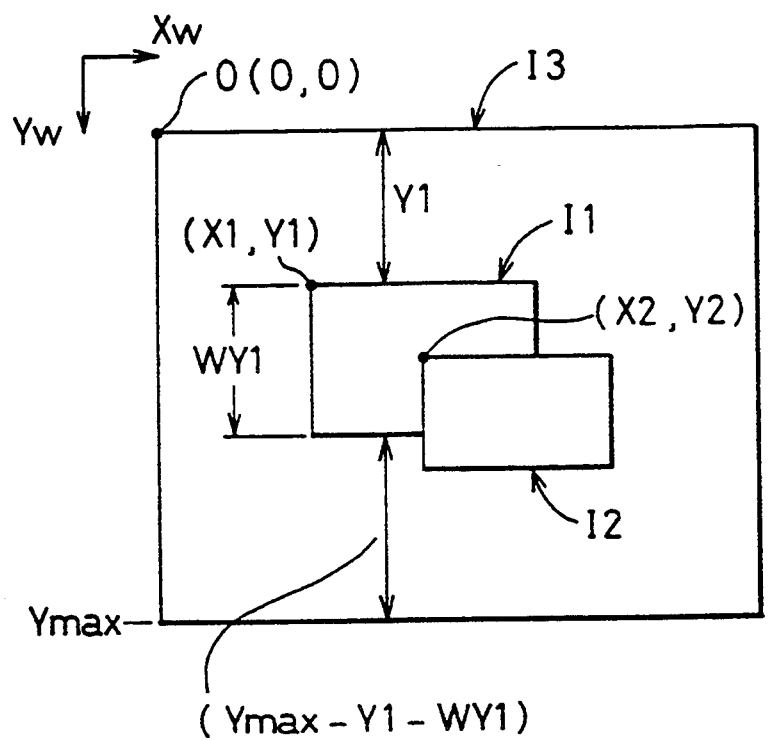
FIG. 15 is an explanatory view showing combination of two offset linework images.

(1) Although the linework images before the combining process in the above embodiment do not include any offset, that is, a positional shift from the origin of the combined linework image, linework images may have an offset. FIG. 15 is an explanatory view showing the process of combining two linework images I1 and I2 having a offset, to produce a combined linework image I3. The offsets of the linework images I1 and I2 are (X1, Y1) and (X2, Y2), respectively.

Since the image part which is inside the combined linework image I3 and outside the target linework images I1 and I2 is treated as a background area, the run-length data representing the background area is added to the linework data of each linework image I1 and I2 in the combining process. For example, the run-length data representing the background area, which has the pasting priority of 1, the transparency data of 1, and the dot percent of 0% for each color component, is produced for each scanning line having the secondary-scanning coordinate up to (X1-1) in the first linework image I1. The unit-run data having the run-length of Y1 and the same color code as the background area is added to the beginning of each scanning line running on the linework image I1, where Y1 is the offset in the primary scanning direction Yw of the linework image I1. The unit-run data having the run-length of (Ymax-Y1-WY1) and the same color code as the background area is added to the end of each scanning line running on the linework image I1, where Ymax denotes the maximum value of the primary-scanning coordinate of the combined linework image I3, and WY1 denotes the width of the first linework image I1 in the primary scanning direction Yw. The unit-run data is also added to the linework data of the second linework image I2 corresponding to its offset as in the case of the first linework image I1.

In this manner, the linework data of the first and second linework images I1 and I2 become to represent an image area having the same size as the combined linework image I3. Three or more linework images with an offset can be combined in the same manner.

(2) The unit run-data may have a different structure other than that of the unit-run data in the above embodiment. For example, the unit-run data may include the coordinate of the end point of each run in place of the run-length. In general, the unit-run data may have any structure as far as it indicates the run-length of each run, the color data representing the color of the run, the transparency data showing whether an underlaid linework image can be observed from the top, and a pasting priority showing an overlay arrangement of the plural linework images.

(3) Although the same color code is allocated to plural runs of each linework image having the same combination of the pasting priority, the color data, and the transparency data in the above embodiment, different color codes may be assigned to the runs having the same combination. Although a separate color table is defined for each linework image in the above embodiment, a common color table can be used for all the linework images.

(4) FIG. 16 schematically illustrates another set of input linework data D1–D6 and output linework data D7. The first input linework data D1 represents a base page and register marks on the base page. The second linework data D2 represents a cut out mask for a picture to be pasted. The picture is cut along the contour of the cut out mask to be pasted on the base page. The third linework data D3 represents an illustration which consists of lines and tint areas, or uniform color areas. The fourth to sixth linework data D4–D6 represent a text, a bar code, and a logo, respectively. The output linework data D7 is produced by combining these linework data D1–D6.

FIG. 17 schematically illustrates the method of combining the input linework data D1–D7 to produce the output linework data D7. FIG. 17 corresponds to FIGS. 4(a) through 4(d) in the first embodiment of the present invention. At the state of FIG. 17, a set of the input linework data D1(2)–D6(2) are being supplied to the input linework memory 48 to be stored therein. The linework operation memory 50 memorizes another set of the input linework data Di(1)–D6(1), which have been transferred from the input linework memory 48 to the linework operation memory 50 before. The input linework data Di(1)–D6(1) in the linework operation memory 50 represent respective parts of the input lineworks to be pasted on a part BP1 of the base page while the input linework data D1(2)–D6(2) in the input linework memory 48 represent respective parts of the input lineworks to be pasted on the next part BP2 of the base page.

The combining process to combine the linework data D1–D6 is the same as that in the first embodiment of the present invention. As shown in FIGS. 16 and 17, various kinds of lineworks can be combined to produce a combined linework including a plurality of linework elements according to the present invention.

According to the present invention, the input linework data is supplied from the external storage unit 64 to the input linework memory 48 while the combining operation is executed. Namely, a new set of input linework data is supplemented without delaying the execution of the combining operation significantly, thus attaining high-speed combining operation. Especially, since the speed of data transfer from the input linework memory 48 to the linework operation memory 50 is far greater than that of data transfer from the external storage unit 64, the operation time for the whole combining process can be reduced accordingly.

Further, since the working data memorized in the input linework management table 58 include unit-run data, the pasting priority of the unit-run data, and the transparency data of the unit-run data, the combined unit-run data can be extracted from the working data of plural lineworks according to the pasting priority and the transparency data. Therefore the combined linework data including the combined unit-run data can be produced without re-converting run-length data to pixel image data.

Although the present invention has been described and illustrated in detail, it is clearly understood that the same is byway of illustration and example only and is not to be taken by way of limitation, the spirit and scope of the present invention being limited only by the terms of the appended claims.

What is claimed is:

1. An apparatus for combining a plurality of linework data including run-length data representing a plurality of linework images to produce combined linework data representing a combined linework image which is obtained by combining said plurality of linework images, respectively, comprising:

a first processor;

a first bus connected to said first processor;

an auxiliary memory, connected to said first bus, for memorizing said plurality of linework data;

a second processor;

a second bus connected to said second processor; and first, second, and third main memories of said second processor for memorizing linework data, said first and third main memories being connected to both of said first and second buses, said second main memory being connected to said second bus;

wherein said first processor includes:

first data-transfer means for transferring at least a part of each of said plurality of linework data from said auxiliary memory to said first main memory through said first bus; and said second processor includes:

second data-transfer means for detecting a necessity of data supplementing to said second main memory, and supplementing at least a part of said plurality of linework data from first main memory to said second main memory through said second bus; and combining means for combining respective parts of said plurality of linework data stored in said second main memory to produce said combined linework data, and storing said combined linework data in said third main memory.

2. An apparatus in accordance with claim 1, wherein said second data-transfer means includes means for detecting said necessity of data supplementing when one of said plurality of linework data stored in said second memory has been used up in producing said combined linework data.

3. An apparatus in accordance with claim 1, further comprising:

a dual port RAM, connected to said first and second buses, for memorizing information concerning an image processing operation to be exchanged between said first and second processors, whereby said first and second processors cooperate with each other concerning said image processing operation according to said information.

4. An apparatus in accordance with claim 1, wherein said first and third main memories are complementarily connected to said first and second buses, and are switched alternately on demand.

5. An apparatus in accordance with claim 1, wherein said linework data comprises run-length data constituted of unit-run data, said unit-run data including a run-length of each run of a linework image in a predetermined scanning direction, color data representing color of said each run, transparency data indicating whether another linework image laid under said linework image can be seen through said linework data, and a pasting priority indicating an order of overlaying a plurality of linework images; and said combining means further comprises:

means for computing a last coordinate in a combined linework image which has already been combined, and memorizing said last coordinate as a current coordinate;

means for computing a run-end coordinate of each run for each unit-run data of said plurality of linework data stored in said second main memory, said run-end coordinate indicating a coordinate of an end of said each run, and selecting unit-run data as working data with respect to each of said plurality of linework data stored in said second main memory, said working data having a smallest run-end coordinate among unit-run data which have run-end coordinates larger than said current coordinate, and memorizing said working data for said each of said plurality of linework data; and means for producing combined unit-run data representing a run of said combined linework image according to said transparency data and said pasting priority of said working data for said each of said plurality of linework data stored in said second main memory, said combined linework image being an image which is observed when a plurality of linework images represented by said plurality of linework data are overlaid.

6. An apparatus for combining a plurality of linework data including run-length data representing a plurality of linework images to produce combined linework data representing a combined linework image which is obtained by combining said plurality of linework images, respectively, comprising:

an auxiliary memory for storing said plurality of linework data;

first and second main memories for storing at least part of said plurality of linework data;

first data-transfer means for transferring at least a part of each of said plurality of linework data from said auxiliary memory to said first main memory through a first bus;

second data-transfer means for detecting a necessity of data supplementing to said second main memory, for supplementing at least a part of said plurality of linework data from said first main memory to said second main memory through a second bus; and combining means for reading said plurality of linework data stored in said second main memory through said second bus, and producing said combined linework data.

7. An apparatus in accordance with claim 6, wherein said second data-transfer means includes means for detecting said necessity of data supplementing when one of said plurality of linework data stored in said second memory has been used up in producing said combined linework data.

8. An apparatus in accordance with claim 6, further comprising:

a dual port RAM, connected to said first and second buses, for memorizing information to be exchanged between said first and second data-transfer means, whereby said first and second data-transfer means cooperate according to said information.

9. An apparatus in accordance with claim 6, wherein said first and third main memories are complementarily connected to said first and second buses, and are switched alternately on demand.

10. An apparatus in accordance with claim 6, wherein said linework data comprises run-length data constituted of unit-run data, said unit-run data including a run-length of each run of a linework image in a predetermined scanning direction, color data representing color of said each run, transparency data indicating whether another linework image laid under said linework image can be seen through said linework data, and a pasting priority indicating an order of overlaying a plurality of linework images; and said combining means further comprises:

means for computing a last coordinate in a combined linework image which has already been combined, and memorizing said last coordinate as a current coordinate;

means for computing a run-end coordinate of each run for each unit-run data of said plurality of linework data stored in said second main memory, said run-end coordinate indicating a coordinate of an end of said each run, and Selecting unit-run data as working data with respect to each of said plurality of linework data stored in said second main memory,, said working data having a smallest run-end coordinate among unit-run data which have run-end coordinates larger than said current coordinate, and memorizing said working data for said each of said plurality of linework data; and means for producing combined unit-run data representing a run of said combined linework image according to said transparency data and said pasting priority of said working data for said each of said plurality of linework data, said combined linework image being an image which is observed when a plurality of linework images represented by said plurality of linework data are overlaid.

11. A method of combining a plurality of linework data including run-length data using a computer including an auxiliary memory, and first and second main memories, to produce combined linework data representing a combined linework image, said method comprising the steps of:

(a) storing said plurality of linework data in said auxiliary memory;

(b) transferring at least a part of each of said plurality of linework data from said auxiliary memory to said first main memory through a first bus;

(c) detecting a necessity of data supplementing to said second main memory, and supplementing at least a part of said plurality of linework data from said first main memory to said second main memory through a second bus; and (d) reading said plurality of linework data from said second main memory through said second bus, and producing said combined linework data.

12. A method in accordance with claim 11, wherein said step (c) includes the step of detecting said necessity of data supplementing when one of said plurality of linework data stored in said second memory has been used up in producing said combined linework data.

13. A method in accordance with claim 11, wherein said first and third main memories are complementarily connected to said first and second buses, and are switched alternately on demand.

14. A method in accordance with claim 11, wherein said linework data comprises run-length data constituted of unit-run data, said unit-run data including a run-length of each run of a linework image in a predetermined scanning direction, color data representing color of said each run, transparency data indicating whether another linework image laid under said linework image can be seen through said linework data, and a pasting priority indicating an order of overlaying a plurality of linework images; and said step (d) further comprises the steps of:

(d-1) computing a last coordinate in a combined linework image which has already been combined, and memorizing said last coordinate as a current coordinate;

(d-2) computing a run-end coordinate of each run for each unit-run data of said plurality of linework data stored in said second main memory, said run-end coordinate indicating a coordinate of an end of said each run, and selecting unit-run data as working data with respect to each of said plurality of linework data stored in said second main memory, said working data having the smallest run-end coordinate among unit-run data which have run-end coordinates larger than said current coordinate, and memorizing said working data for said each of said plurality of linework data; and (d-3) producing combined unit-run data representing a run of said combined linework image according to said transparency data and said pasting priority of said working data for said each of said plurality of linework data, said combined linework image being an image which is observed when a plurality of linework images represented by said plurality of linework data are overlaid.

\* \* \* \* \*